(12) United States Patent
Mittler et al.

(10) Patent No.: US 9,217,507 B2
(45) Date of Patent: Dec. 22, 2015

(54) MULTI-PART PISTON RING

(75) Inventors: Richard Mittler, Leverkusen (DE); Thomas Schulte-Sasse, Wermelskirchen (DE); Manfred Muller, Burscheid (DE)

(73) Assignee: Federal-Mogul Burscheid GmbH, Burscheid (DE)

(*) Notice: Subject to any disclaimer, the term of this patent is extended or adjusted under 35 U.S.C. 154(b) by 192 days.

(21) Appl. No.: 13/502,843

(22) PCT Filed: Sep. 9, 2010

(86) PCT No.: PCT/EP2010/063243
§ 371 (c)(1),
(2), (4) Date: Aug. 7, 2012

(87) PCT Pub. No.: WO2011/047922
PCT Pub. Date: Apr. 28, 2011

(65) Prior Publication Data
US 2012/0306159 A1 Dec. 6, 2012

(30) Foreign Application Priority Data

Oct. 19, 2009 (DE) .......................... 10 2009 049 788

(51) Int. Cl.
*F16J 9/06* (2006.01)
*F16J 9/14* (2006.01)

(52) U.S. Cl.
CPC ... *F16J 9/062* (2013.01); *F16J 9/14* (2013.01)

(58) Field of Classification Search
CPC ............... F16J 9/14; F16J 15/26; F16J 9/062
USPC ......... 277/434, 436, 449, 467, 472, 310, 357, 277/490, 469
See application file for complete search history.

(56) References Cited

U.S. PATENT DOCUMENTS

| 2,951,732 | A | * | 9/1960 | Brenneke | 277/451 |
| 5,664,536 | A | * | 9/1997 | Bigsby | 123/193.4 |
| 6,322,080 | B1 | * | 11/2001 | Feistel | 277/490 |
| 6,367,808 | B1 | * | 4/2002 | Feistel | 277/490 |
| 6,631,908 | B2 | * | 10/2003 | Mittler et al. | 277/458 |
| 2003/0184023 | A1 | * | 10/2003 | Masuyama et al. | 277/434 |
| 2012/0306159 | A1 | * | 12/2012 | Mittler et al. | 277/469 |

FOREIGN PATENT DOCUMENTS

| DE | 1292447 | | 4/1969 |
| DE | 2000923 | A1 | 7/1971 |
| DE | 2443299 | | 3/1976 |
| DE | 3821 193 | * | 9/1989 |

(Continued)

*Primary Examiner* — Kristina Fulton
*Assistant Examiner* — Nathan Cumar
(74) *Attorney, Agent, or Firm* — Robert L. Stearns; Dickinson Wright, PLLC

(57) ABSTRACT

A multi-part piston ring, containing an at least single-part spring support which is provided with a piston ring joint region and an at least single-part spring element, which is positioned in a groove provided in the region of the inner circumferential face of the spring support, wherein the wall thickness of the spring support is essentially equal in the region of the ends of the spring support facing the piston ring joint and in the rear region of the spring support, and a pocket which extends over a circumferential range of at least 60° and is created by local reduction of the wall thickness of the spring support is provided in each case between the rear region and the piston ring joint ends.

7 Claims, 3 Drawing Sheets

(56) References Cited

FOREIGN PATENT DOCUMENTS

| | | | |
|---|---|---|---|
| DE | 3821193 | C1 | 9/1989 |
| DE | 4310249 | C1 | 12/1994 |
| DE | 10041802 | C1 | 2/2002 |
| JP | 9196171 | A | 7/1997 |

* cited by examiner

MULTI-PART PISTON RING

The invention relates to a multi-part piston ring.

DE 100 41 802 C1 discloses a single-part compression piston ring which is provided with a piston ring joint region and has cross section weak points on the ring circumference, the ring circumference of the compression piston ring being divided into four quadrants, wherein, when one piston ring joint edge is positioned in the first and the other piston ring joint edge is positioned in the fourth of the imaginary quadrants, the respective cross section weak point is only provided in the first and fourth quadrants.

DE 12 92 447 discloses an oil scraper ring for internal combustion engine pistons, having a helical spring ring which provides its tension and rests in an annular groove, the annular groove which receives the helical spring ring having a flat recess in the region of the piston ring joint.

DE 24 43 299 describes an oil scraper ring for a piston of an internal combustion engine, having slots distributed over the circumference and a spring which presses the oil scraper ring against the cylinder walls, the oil scraper ring having an at least approximately constant area moment of inertia over the entire circumference. In order to achieve the area moment of inertia, material is removed between slots on radially inner rotationally symmetrical areas of the oil scraper ring.

The invention is based on the object of developing a multi-part piston ring consisting of a spring support and spring element such that the radial pressure distribution, viewed over the entire circumference of the piston ring, can be made more uniform by optimising the spring support in functional connection with the spring element. The radial pressure distribution of the piston ring in the cylinder under the effect of temperature should in particular be made more uniform.

This object is achieved by a multi-part piston ring, containing an at least single-part spring support which is provided with a piston ring joint region and an at least single-part spring element, which is positioned in a groove provided in the region of the inner circumferential face of the spring support, wherein the wall thickness of the spring support is essentially equal in the region of the ends of the spring support facing the piston ring joint and in the rear region of the spring support, and a pocket which extends over a circumferential range of at least 60° and is created by local reduction of the wall thickness of the spring support is provided in each case between the rear region and the piston ring joint ends. Additionally, the radial depth of the circumferential groove, in the circumferential direction of the spring support, is modified by a cross-sectional change in the radial wall thickness relative to the running surface of the spring support in such a manner that the annular spring element is positioned inside the groove with a predefined ovality in a plane perpendicular to the axial direction of the piston ring.

Advantageous developments of the subject matter of the invention can be found in the dependent claims.

Analogously to the prior art according to DE 100 41 802 C1, the piston ring can notionally be divided into four quadrants. The respective pocket can be situated in the first or fourth quadrant. Alternatively, the pocket can be situated in the second or third quadrant.

It is likewise conceivable for the pocket to be made across quadrants in the spring support between the rear of the ring and the respective piston ring joint end.

It is particularly advantageous with respect to the radial pressure distribution if the pockets are provided symmetrically in the region of the respective quadrant.

It is furthermore advantageous if the cross-sectional change of the groove is only provided in the region of the respective pocket of the spring support.

The subject matter of the invention should generally in the first instance be applied to any type of piston ring. However, it is particularly advantageous to use the piston ring according to the invention as an at least two-part oil scraper ring, as compression rings are generally formed as single-part piston rings.

If the piston ring according to the invention is an oil scraper ring, it is furthermore proposed that the spring support be provided with at least two running surface webs.

With the subject matter of the invention, the surface pressure onto the cylinder wall by the contact faces of the spring support can be locally adjusted, by adapting the spring position and by locally changing the area moment of inertia of the spring support. In this case a cross-section change is made locally on the circumference (local change in the area moment of inertia), which advantageously affects both the spring position and the spring contact forces on the spring support and thus on the cylinder wall.

Temperature effects in the system on the spring support produce a positive ovality in the running of the fuelled engine. These positive ovalities (increased radial pressure on the piston ring joint end, which acts on the cylinder wall) result in negative effects in the cylinder such as poor oil scraping and formation of striations on the cylinder wall. As a result of the local change in the ring support, the radial pressure distribution in the cylinder can be made uniform under the influence of temperature.

According to the invention, a spring-supported piston ring, in particular an oil scraper ring, with non-uniform radial pressure distribution is thus proposed in such a manner that the radial pressure distribution assumes a minimum value in the region of the piston ring joint ends and assumes a maximum value in the range of 20 to 120° starting from the piston ring joint. The change in wall thickness is in this case produced from the superposition of a fifth order cosine function with the radius of curvature of the open spring support such that the radial pressure distribution on the running surface assumes a constant function and thus has no jumps.

The subject matter of the invention is shown in the drawing using an exemplary embodiment and is described as follows:
In the figures.

Figure 1:
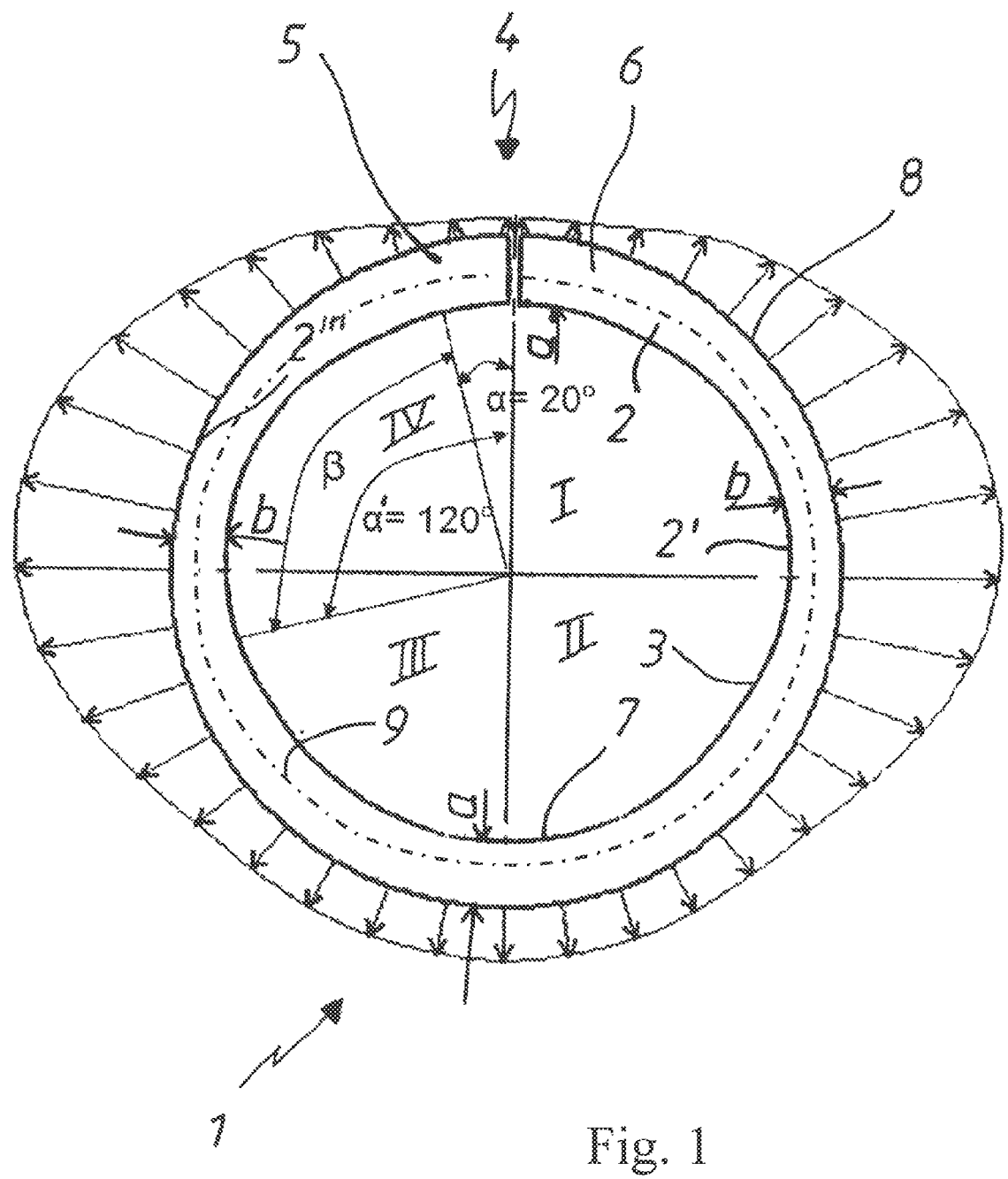
FIG. 1 shows a principle diagram of a piston ring according to the invention which is configured as an oil scraper ring, with the radial pressure distribution indicated.

FIG. 1 shows a principle diagram of a piston ring 1 according to the invention which is configured as an oil scraper ring, with the radial pressure distribution indicated. The oil scraper ring 1 should be in two parts, as claimed, and contains an annular spring support 2 and a likewise annular spring element 3, which is merely indicated here. The spring support 2 is provided with a piston ring joint 4, so two piston ring joint ends 5, 6 are formed. Analogously to the prior art, the piston ring 1 has been divided into four quadrants I, II, III, IV arranged clockwise. The wall thickness a of the spring support 2 is essentially equal in the region of the piston ring joint ends 5, 6 and in the ring rear region 7 opposite the piston ring joint 4. The radial pressure distribution of the piston ring 1 as seen in the circumferential direction is indicated by arrows. It can be seen that there is a non-uniform radial pressure distribution in the circumferential direction. The cross section of the spring support 2 undergoes a change in wall thickness b starting from the piston ring joint 4 in the range β ($\alpha$>20° to max. $\alpha'$ 120°) from the piston ring joint 4 in such a manner that the radial pressure distribution assumes a minimum value in the region of the piston ring joint ends 5, 6 and a maximum value in the range β. The change in wall thickness a-b is produced from the superposition of a fifth order cosine function with the radius of curvature of the open spring support 2 in such a form that the radial pressure distribution on the running surface 8 assumes a constant function and thus has no jumps.

The circumferential range $\alpha$-$\alpha'$ is in this case produced by forming pockets 2', 2'', which entail the reduction in wall thickness a-b.

Figure 2:
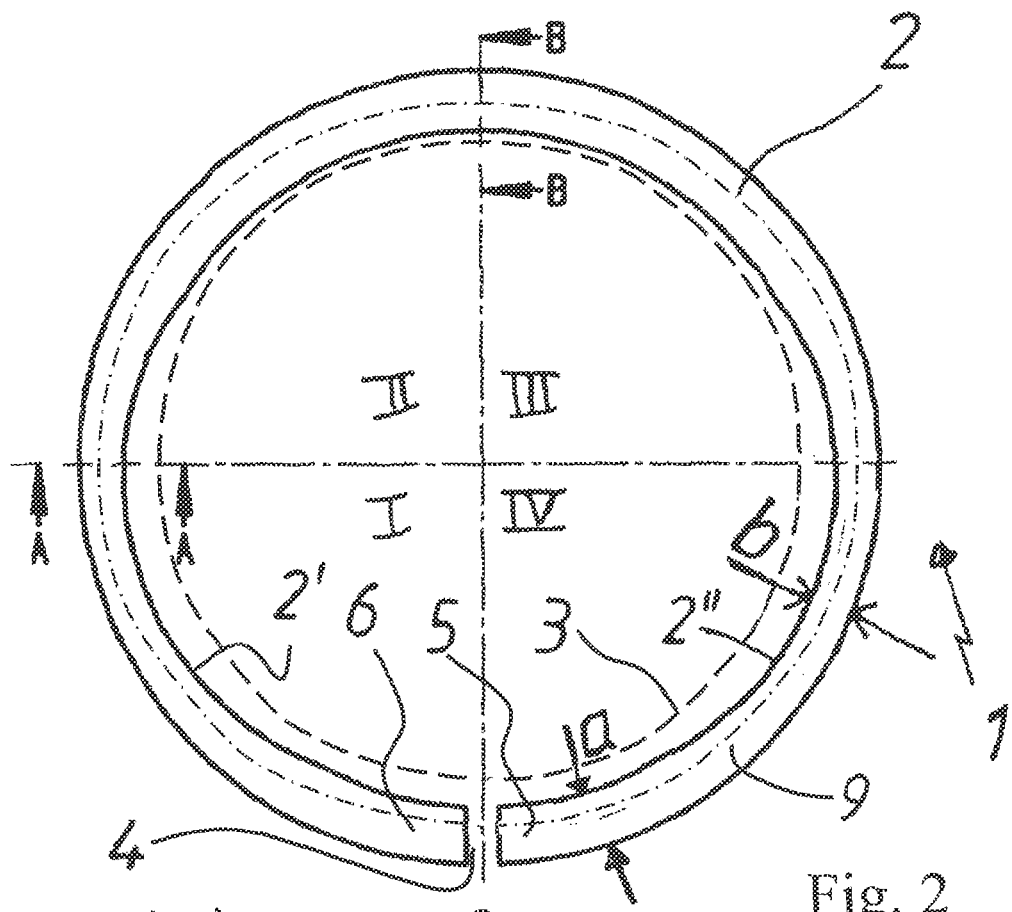
FIG. 2 shows the oil scraper ring according to FIG. 1 with a groove receiving the spring element.
Figure 2:
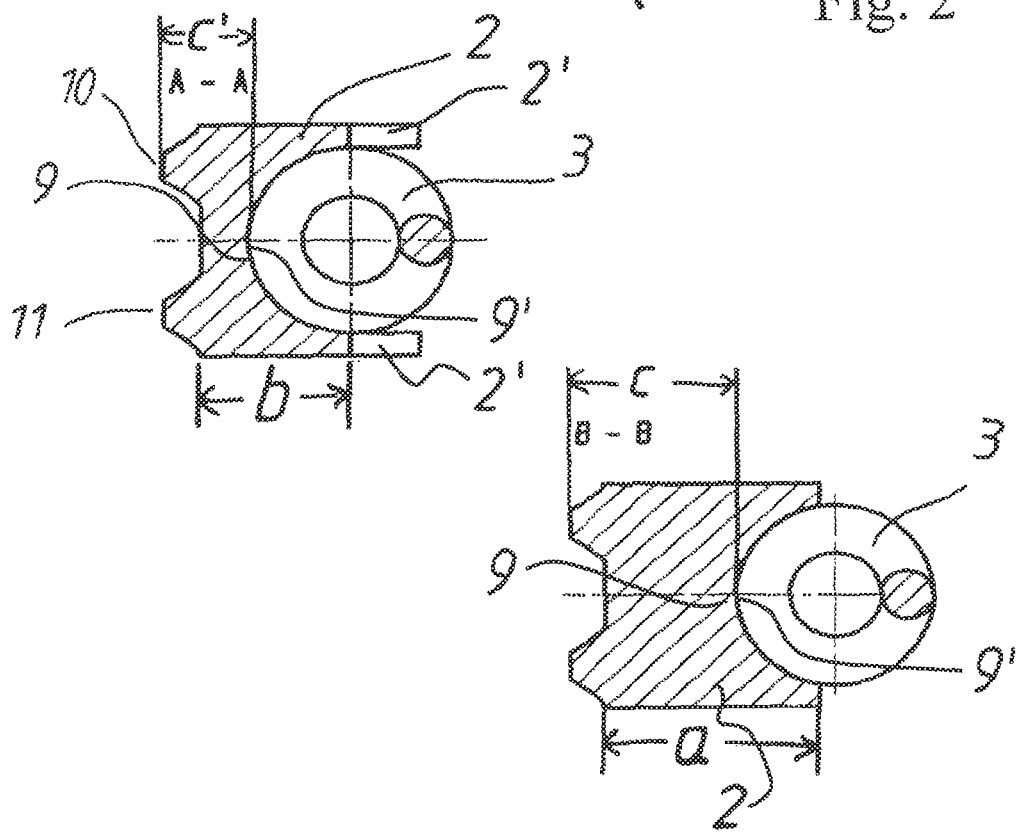

FIG. 2 shows the piston ring 1 according to FIG. 1 in different views and sections. The same components are provided with the same reference symbols. The annular spring support 2 is shown as well as the likewise annular spring element 3, which is introduced into a circumferential groove 9 in the spring support 2. Analogously to FIG. 1, it can be seen that the piston ring 1 is divided into four quadrants I to IV. The piston ring joint is provided with the reference symbol 4. In this example the piston ring 1 has two running surface webs 10, 11. It can be seen in sections D-D and E-E that the region of the piston ring joint ends 5, 6 includes the full wall thickness a. The reduction in wall thickness from a to b begins, analogously to FIG. 1, at an angle $\alpha$ of 20° and extends, starting from the piston ring joint 4, over an angle $\alpha'$ of 120°. The minimum wall thickness b can be seen in section D-D of FIG. 2. The wall thickness c, from the groove bottom 9' of the circumferential groove 9 as far as the running webs 10, 11, remains unchanged as seen in the circumferential direction.

The pockets 2', 2'' indicated in FIG. 1 can likewise be seen here.

Figure 3:
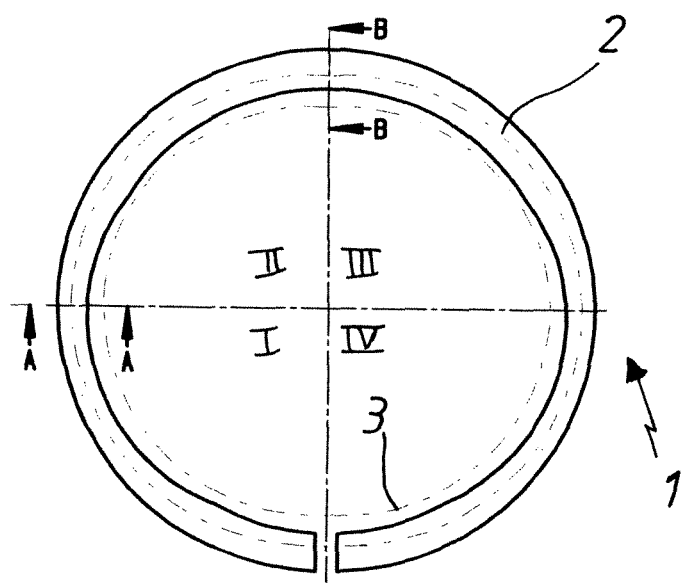
FIG. 3 shows the oil scraper ring according to FIG. 1 with a wall thickness of the groove receiving the spring element which changes, viewed over the circumference of the piston ring.
Figure 3:
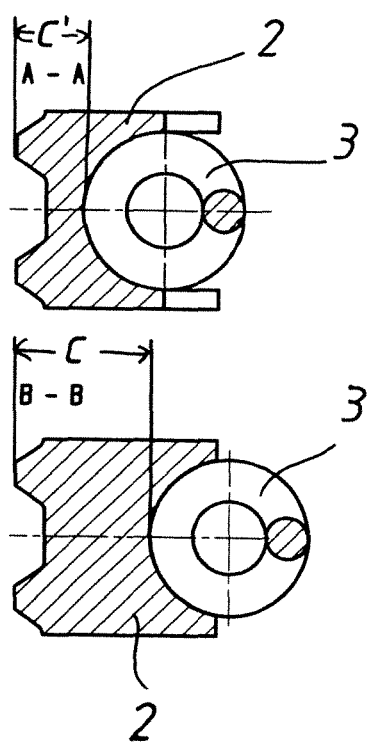

This is different in FIG. 3. This figure shows that the wall thickness c (section A-A, B-B) is reduced to the wall thickness c' from the second to the first quadrant.

The invention claimed is:

1. A multi-part piston ring, comprising
   an at least single-part circular spring support which is provided with a piston ring joint region and
   an at least single-part non-circular spring element which is positioned in a grooved provided in a region of the inner circumferential face of the spring support,
   wherein a wall thickness of the spring support is about equal in a region of piston ring joint ends of the spring support facing the piston ring joint and in a rear region of the spring support, and
   wherein at least one pocket which extends over a circumferential range of at least 60° is provided by local reduction of the wall thickness of the spring support provided in each case between the rear region and the piston ring joint ends of the spring support and wherein, a reduction in the wall thickness cross section of the spring support, starting from the piston ring joint, in a circumferential range from $\alpha$>20° to $\alpha'$ of max. 120° is provided in such a manner that the radial pressure distribution assumes at a minimum value in the region of the piston ring joint ends and at a maximum value in the range of reduced wall thickness,
   wherein a radial depth of the circumferential groove is modified in the circumferential direction of the spring support, by changing the radial wall thickness of the piston ring measured between a running surface and a bottom of the spring support in such a manner that the circumferential groove is non-circular and has a predefined ovality in a plane perpendicular to the axial direction of the piston ring.

2. The piston ring according to claim 1 wherein the spring support, starting from the piston ring joint, is divided into four quadrants and the respective pocket is situated in the first and fourth quadrants.

3. The piston ring according to claim 1, wherein the spring support, starting from the piston ring joint, is divided into four quadrants and the respective pocket is situated in a circumferential range of the spring support which covers the first and second and the third and fourth quadrants.

4. The piston ring according to claim 2, wherein the pockets are provided symmetrically in the region of the respective quadrants.

5. The piston ring according to claim 1, wherein the cross-sectional change in the groove is provided in the region of the respective pocket of the spring support.

6. The piston ring according to claim 1, comprising an at least two-part oil scraper ring.

7. The piston ring according to claim 1, wherein the spring support has at least two running surface webs.

\* \* \* \* \*